(12) United States Patent
Chida et al.

(10) Patent No.: US 10,678,100 B2
(45) Date of Patent: Jun. 9, 2020

(54) LIQUID CRYSTAL DISPLAY DEVICE

(71) Applicant: SHARP KABUSHIKI KAISHA, Sakai, Osaka (JP)

(72) Inventors: Mitsuru Chida, Sakai (JP); Emi Yamamoto, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/778,748

(22) PCT Filed: Feb. 16, 2017

(86) PCT No.: PCT/JP2017/005761
§ 371 (c)(1),
(2) Date: May 24, 2018

(87) PCT Pub. No.: WO2017/145911
PCT Pub. Date: Aug. 31, 2017

(65) Prior Publication Data
US 2018/0348558 A1     Dec. 6, 2018

(30) Foreign Application Priority Data
Feb. 23, 2016 (JP) .................. 2016-032334

(51) Int. Cl.
*G02F 1/1343* (2006.01)
*G02F 1/1368* (2006.01)
(Continued)

(52) U.S. Cl.
CPC .......... *G02F 1/1343* (2013.01); *G02F 1/1368* (2013.01); *G02F 1/134309* (2013.01);
(Continued)

(58) Field of Classification Search
None
See application file for complete search history.

(56) References Cited

U.S. PATENT DOCUMENTS

| 5,600,464 A | 2/1997 | Ohe et al. |
| 6,281,953 B1 | 8/2001 | Lee et al. |

(Continued)

FOREIGN PATENT DOCUMENTS

| JP | H10-319406 A | 12/1998 |
| JP | 2000-089255 A | 3/2000 |

(Continued)

*Primary Examiner* — Edward J Glick
*Assistant Examiner* — Anthony G Quash
(74) *Attorney, Agent, or Firm* — ScienBiziP, P.C.

(57) ABSTRACT

The present invention makes it possible to reduce an after-image phenomenon while preventing an increase in driving voltage. A liquid crystal display device (10) includes: a liquid crystal layer (3) and a pair of substrates which face each other across the liquid crystal layer (3); and an upper electrode (4), a lower electrode (5), and a first insulating layer (6) which are provided in a stack on one substrate (1) of the pair of substrates so that the upper electrode (4) and the lower electrode (5) overlap each other via the first insulating layer (6), the upper layer electrode (4) having an end surface which constitutes an opening of the upper electrode (4), the end surface being forward tapered and forming, with the one substrate (1), an average angle of inclination of not more than 30 degrees.

5 Claims, 10 Drawing Sheets

(51) Int. Cl.
*G02F 1/1333* (2006.01)
*G02F 1/1337* (2006.01)

(52) U.S. Cl.
CPC ............... *G02F 1/133345* (2013.01); *G02F 2001/133397* (2013.01); *G02F 2001/134372* (2013.01)

(56) References Cited

U.S. PATENT DOCUMENTS

| | | | |
|---|---|---|---|
| 6,590,627 B2* | 7/2003 | Tomioka | G02F 1/134363 349/106 |
| 6,682,783 B1 | 1/2004 | Tomioka et al. | |
| 2011/0075074 A1* | 3/2011 | Gauza | C09K 19/0275 349/96 |
| 2012/0138938 A1* | 6/2012 | Bae | G02F 1/13439 257/59 |

FOREIGN PATENT DOCUMENTS

| | | |
|---|---|---|
| JP | 2001-194670 A | 7/2001 |
| JP | 2003-029247 A | 1/2003 |
| JP | 2009-080303 A | 4/2009 |
| JP | 2012-118531 A | 6/2012 |
| KR | 2013-0022654 A | 3/2013 |

\* cited by examiner

LIQUID CRYSTAL DISPLAY DEVICE

TECHNICAL FIELD

The present invention relates to a liquid crystal display device. More specifically, the present invention relates to a Fringe Field Switching (FFS) mode liquid crystal display device.

BACKGROUND ART

In order that a liquid crystal display device having an excellent viewing angle characteristic is achieved, an In Plane Switching (IPS) mode instead of a Twisted Nematic (TN) mode has been proposed. In the IPS mode, liquid crystal molecules are controlled with use of a transverse electric field. Meanwhile, in the TN mode, liquid crystal molecules are controlled with use of a longitudinal electric field. Note, however, that in the IPS mode, light is unfortunately used with lower efficiency than in the TN mode.

Under the circumstances, in order to use light with higher efficiency in the IPS mode, Patent Literature 1 has proposed a Fringe Field Switching (FFS) mode. In the FFS mode, liquid crystal molecules are controlled by (i) providing, on one of a pair of substrates, between which a liquid crystal layer is provided, an upper electrode, a lower electrode, and an insulating layer that are provided in a stack so that the upper electrode and the lower electrode overlap each other via the insulating layer, and (ii) using an electric field that is obliquely generated between the upper electrode and the lower electrode (so-called fringe electric field) in response to application of a voltage across the upper electrode and the lower electrode.

In the FFS mode, the upper electrode and the lower electrode are each made of a light-transmitting electroconductive film such as an ITO, and liquid crystals above the upper electrode can be controlled. This allows a higher optical transmittance to be achieved in the FFS mode than in the IPS mode. Furthermore, the FFS mode has an advantage of being great in electric field intensity and allowing a reduction in driving voltage as compared to the IPS mode.

However, in the FFS mode, which is great in electric field intensity, an afterimage (image sticking) phenomenon is more noticeable than in the IPS mode. The afterimage phenomenon is a phenomenon such that a first image that has been displayed by a liquid crystal display device for a long time affects a second image that is displayed by the liquid crystal display device subsequently to the first image. The afterimage phenomenon contributes to deterioration in display performance.

Such an afterimage phenomenon can be reduced by the following proposed method. For example, Patent Literature 2 proposes a method of reducing the afterimage phenomenon by (i) providing one of a pair of substrates, between which a liquid crystal layer is provided, with a group of electrodes, an insulating film, and an alignment film, and (ii) setting the sum of the thickness of the insulating film and the thickness of the alignment film at not less than 0.5 μm and not more than 3 μm.

Furthermore, in transverse electric field modes (e.g., the IPS mode and the FFS mode), in each of which liquid crystal molecules are controlled by causing the liquid crystal molecules to rotate in a plane substantially parallel to a surface of a substrate, not only an afterimage phenomenon that is seen in the TN mode and caused by remaining electric charges but also an afterimage phenomenon unique to the transverse electric field mode occurs. It is considered that the afterimage phenomenon unique to the transverse electric field mode occurs because a surface of an alignment film which controls alignment of liquid crystal molecules is elastically deformed or plastically deformed by a rotation torque caused by twist deformation of liquid crystal molecules, and the elastic deformation or plastic deformation of the surface of the alignment film appears as an afterimage (image sticking).

The afterimage phenomenon unique to the transverse electric field mode can be reduced by (i) using an alignment film having a high elastic modulus and (ii) causing an electric field to be less concentrated. Patent Literatures 3 and 4 each propose a specific method for reducing the afterimage phenomenon unique to the transverse electric field mode.

For example, Patent Literature 3 proposes a method of reducing the afterimage phenomenon by increasing an elastic modulus of an alignment film so that a rotation torque caused by twist deformation of liquid crystal molecules less affects the alignment film.

Furthermore, Patent Literature 4 proposes a method of reducing the afterimage phenomenon, while causing an electric field to be less concentrated, by providing an upper insulating layer between an upper electrode and an alignment film and causing the upper insulating layer to have a higher dielectric constant than an insulating layer provided between the upper electrode and a lower electrode.

CITATION LIST

Patent Literatures

[Patent Literature 1]
Japanese Patent Application Publication Tokukai No. 2000-89255 (Publication date: Mar. 31, 2000)
[Patent Literature 2]
Japanese Patent Application Publication Tokukai No. 2001-194670 (Publication date: Jul. 19, 2001)
[Patent Literature 3]
Japanese Patent Application Publication Tokukaihei No. 10-319406 (Publication date: Dec. 4, 1998)
[Patent Literature 4]
Japanese Patent Application Publication Tokukai No. 2003-29247 (Publication date: Jan. 29, 2003)

SUMMARY OF INVENTION

Technical Problem

However, according to the method proposed in Patent Literature 2, setting of the sum of the thickness of the insulating film and the thickness of the alignment film at not less than 0.5 μm leads to a lower inter-electrode electric field intensity and to a lower optical transmittance. This necessitates an increase in driving voltage.

Same applies to the method proposed in Patent Literature 4. Specifically, according to the method proposed in Patent Literature 4, provision of the upper insulating layer leads to a lower inter-electrode electric field intensity and to a lower optical transmittance. This necessitates an increase in driving voltage.

Furthermore, the FFS mode is 10 or more times higher in electric field intensity than the IPS mode. Thus, the method proposed in Patent Literature 3 may be sufficient to reduce the afterimage-phenomenon.

The present invention has been made in view of the problems. An object of the present invention is to provide a liquid crystal display device capable of reducing the afterimage phenomenon while preventing an increase in driving voltage.

Solution to Problem

In the FFS mode, an electric field is generated, obliquely relative to a substrate, between the upper electrode and the lower electrode (such an electric field is a so-called fringe electric field). The fringe electric field is known to be concentrated at an edge part of the upper electrode. The inventors of the present invention repeatedly diligently studied an electric field intensity of this fringe electric field through simulation, and finally found that electric field concentration at the edge part of the upper electrode greatly varies depending on an average angle of inclination of an end surface of the upper electrode with respect to the substrate, i.e. an angle of taper of the end surface of the upper electrode with respect to the substrate. More specifically, the inventors of the present invention have found that concentration of the fringe electric field can be greatly reduced by causing the end surface of the upper electrode to have an average angle of inclination of not more than 30 degrees.

That is, in order to attain the object, a liquid crystal display device in accordance with one aspect of the present invention includes: a liquid crystal layer and a pair of substrates which faces each other across the liquid crystal layer; and an upper electrode, a lower electrode, and a first insulating layer which are provided in a stack on one of the pair of substrates so that the upper electrode and the lower electrode overlap each other via the first insulating layer, the upper electrode having an opening, the upper electrode having an end surface which constitutes the opening, the end surface being forward tapered and forming, with the one of the pair of substrates, an average angle of inclination of not more than 30 degrees.

Furthermore, the inventors of the present invention have also found that by setting the end surface of the upper electrode to be stepped, it is possible to greatly reduce electric field concentration of the fringe electric field.

That is, in order to attain the object, a liquid crystal display device in accordance with one aspect of the present invention includes: a liquid crystal layer and a pair of substrates which face each other across the liquid crystal layer; and an upper electrode, a lower electrode, and a first insulating layer which are provided in a stack on one of the pair of substrates so that the upper electrode and the lower electrode overlap each other via the first insulating layer, the upper electrode having an opening, the upper electrode having an end surface which constitutes the opening, the end surface having two or more steps so as to be stepped, the two or more steps protruding toward the opening so that a portion on the end surface is closer to the opening as the portion is closer to a lower end of the end surface, the two or more steps of the upper electrode having respective end surfaces each of which forms, with the one of the pair of substrates, a first average angle of inclination of less than 90 degrees.

Advantageous Effects of Invention

An aspect of the present invention makes it possible to reduce the afterimage phenomenon while preventing an increase in driving voltage.

Figure 3:
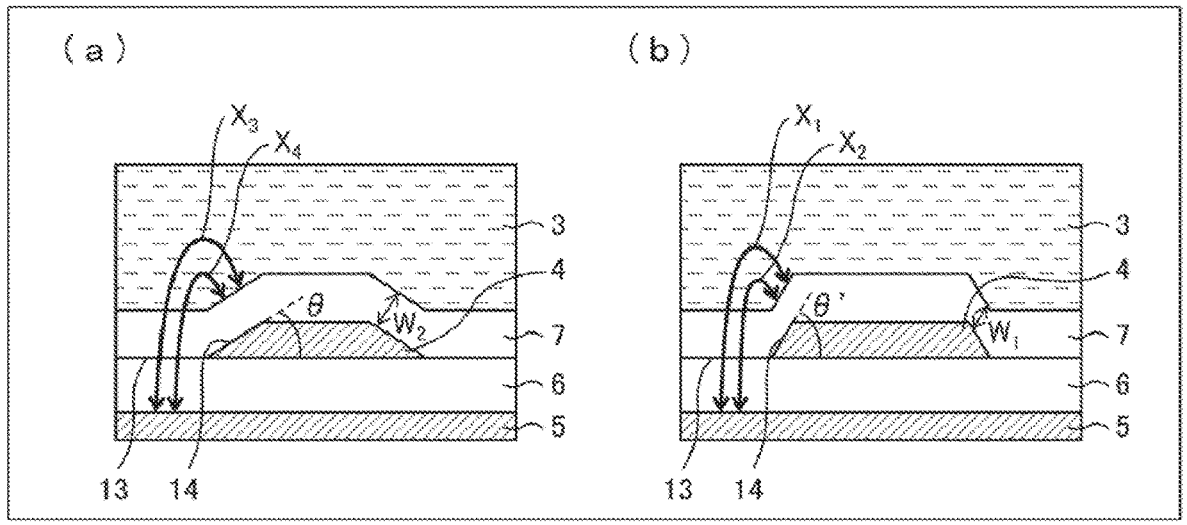

(a) of FIG. 3 is a drawing schematically illustrating a fringe electric field generated in the liquid crystal display device in accordance with Embodiment 1, and (b) of FIG. 3 is a drawing schematically illustrating a fringe electric field generated in a conventional liquid crystal display device.

Figure 4:
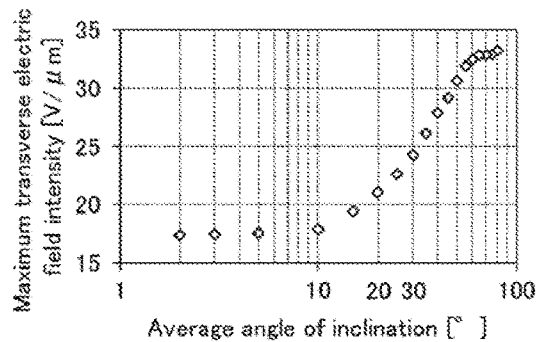

FIG. 4 is a drawing showing a result of simulation of the maximum transverse electric field intensity when an average angle of inclination of an end surface of an upper electrode which end surface constitutes an opening is changed.

Figure 5:
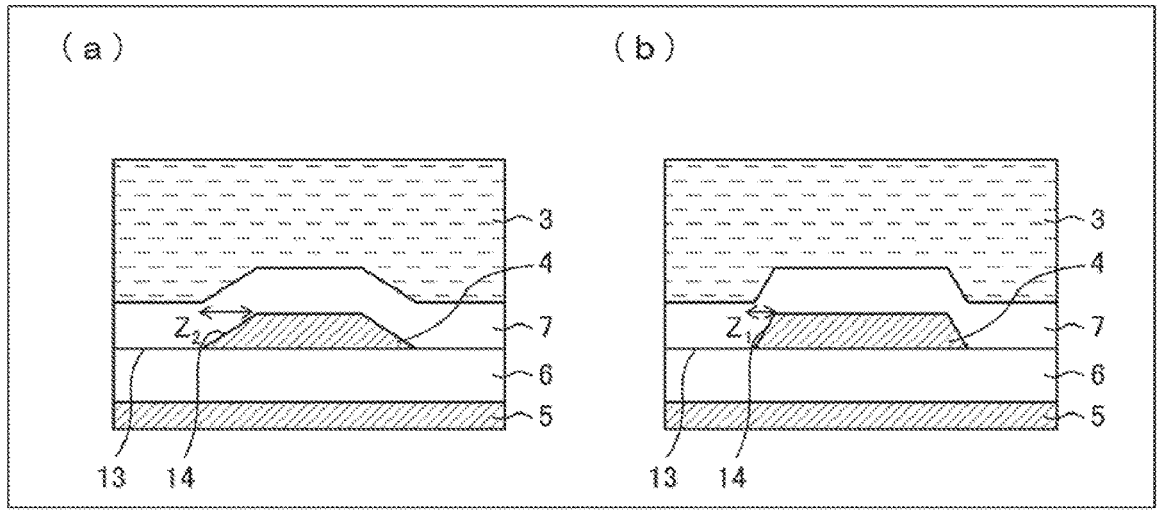

(a) of FIG. 5 is a drawing schematically illustrating a transverse electric field generated in the liquid crystal display device in accordance with Embodiment 1 of the present invention. (b) of FIG. 5 is a drawing schematically illustrating a transverse electric field generated in the conventional liquid crystal display device.

Figure 6:
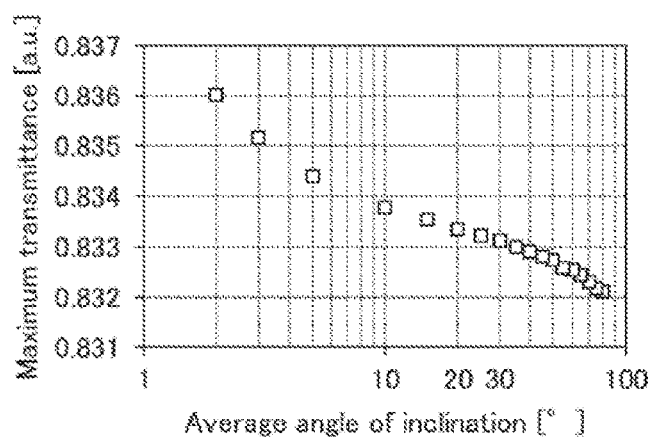

FIG. 6 is a drawing showing a result of simulation of the maximum transmittance in a case where the average angle of inclination of the end surface of the upper electrode which end surface constitutes an opening is changed.

Figure 7:
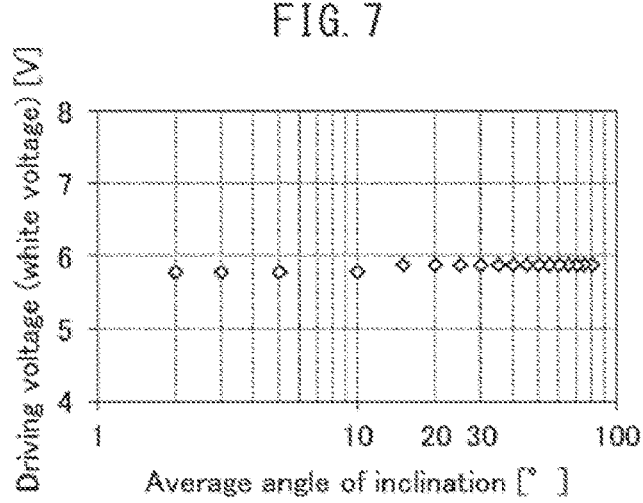

FIG. 7 is a drawing showing a result of simulation of a driving voltage at which the maximum transmittance is reached in a case where the average angle of inclination of the end surface of the upper electrode which end surface constitutes an opening is changed.

Figure 8:
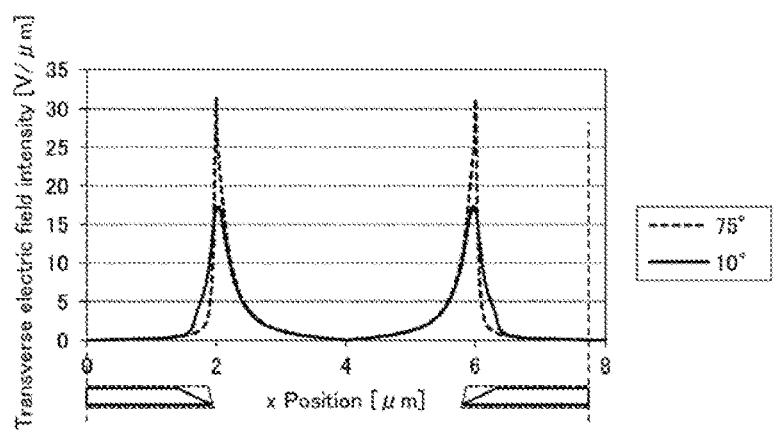

FIG. 8 is a drawing showing (i) a change in transverse electric field intensity depending on the position on the upper electrode in a case where the average angle of inclination of the end surface of the upper electrode is 10 degrees, and (ii) a change in transverse electric field intensity depending on the position on the upper electrode in a case where the average angle of inclination of the end surface of the upper electrode is 75 degrees.

Figure 9:
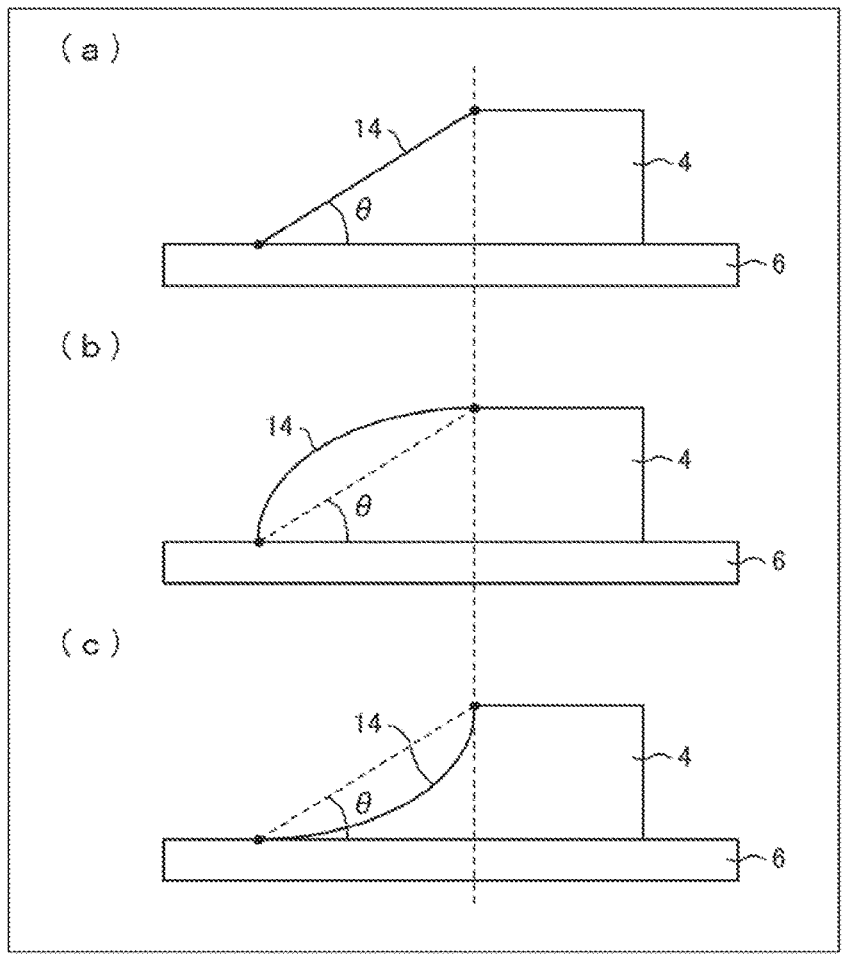

(a) of FIG. 9 to (c) of FIG. 9 illustrate structural examples of the upper electrode in accordance with Embodiment 1 of the present invention.

Figure 10:
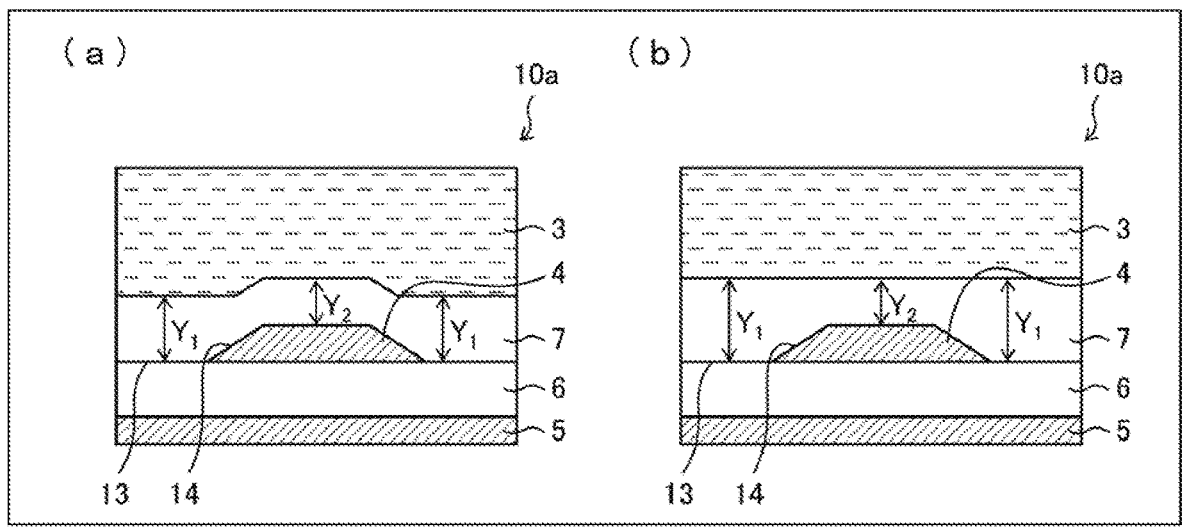

(a) of FIG. 10 and (b) of FIG. 10 are each a partial sectional view of a liquid crystal display device in accordance with Embodiment 2 of the present invention.

Figure 11:
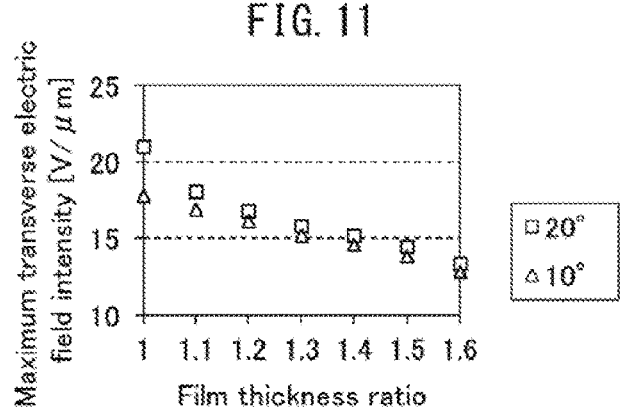

FIG. 11 is a graph showing a result of simulation of the maximum transverse electric field intensity in a case where a film thickness ratio between a film thickness of a second insulating layer at a lower end of an end surface of an upper electrode and a film thickness of the second insulating layer at a top surface of the upper electrode is changed.

Figure 12:
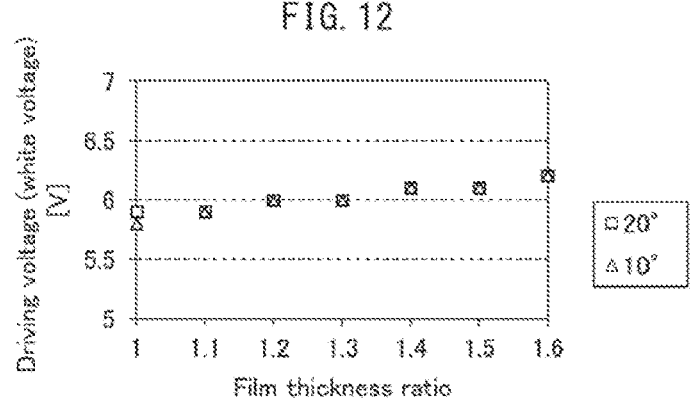

FIG. 12 is a graph showing a result of simulation of a driving voltage at which the maximum transmittance is reached in a case where a film thickness ratio between a film thickness of the second insulating layer at the lower end of the end surface of the upper electrode and a film thickness of the second insulating layer at the top surface of the upper electrode is changed.

Figure 13:
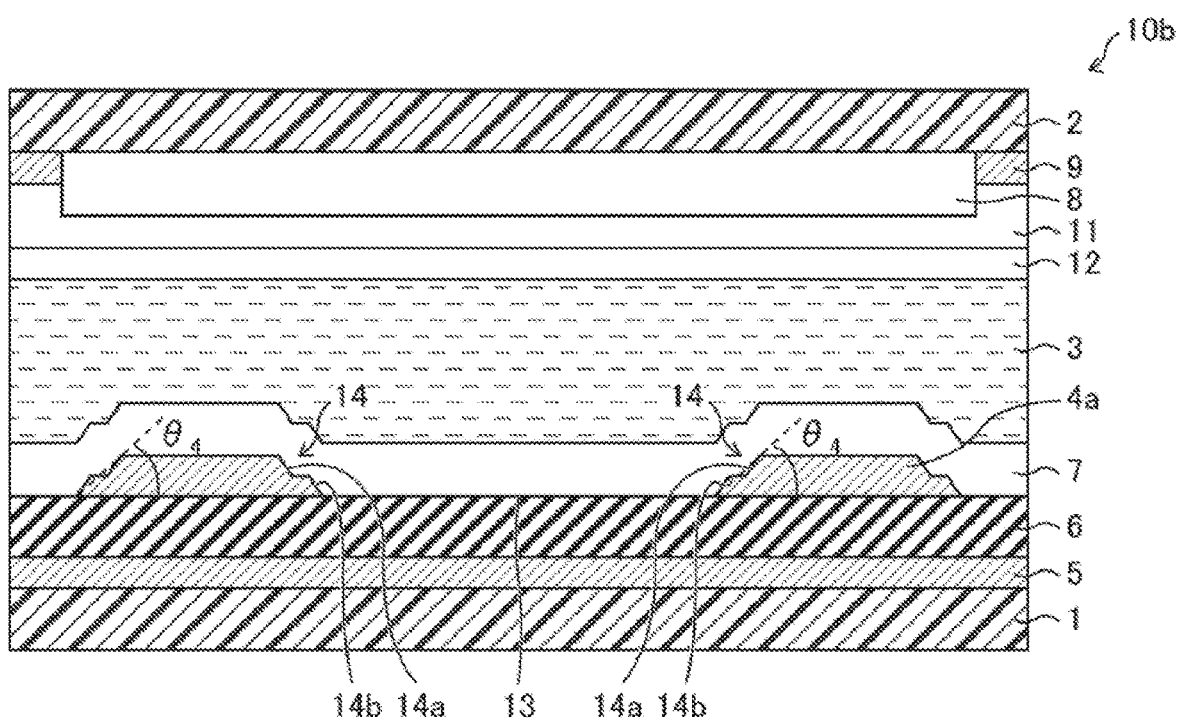

FIG. 13 is a drawing illustrating a configuration of a liquid crystal display device in accordance with Embodiment 3 of the present invention.

Figure 14:
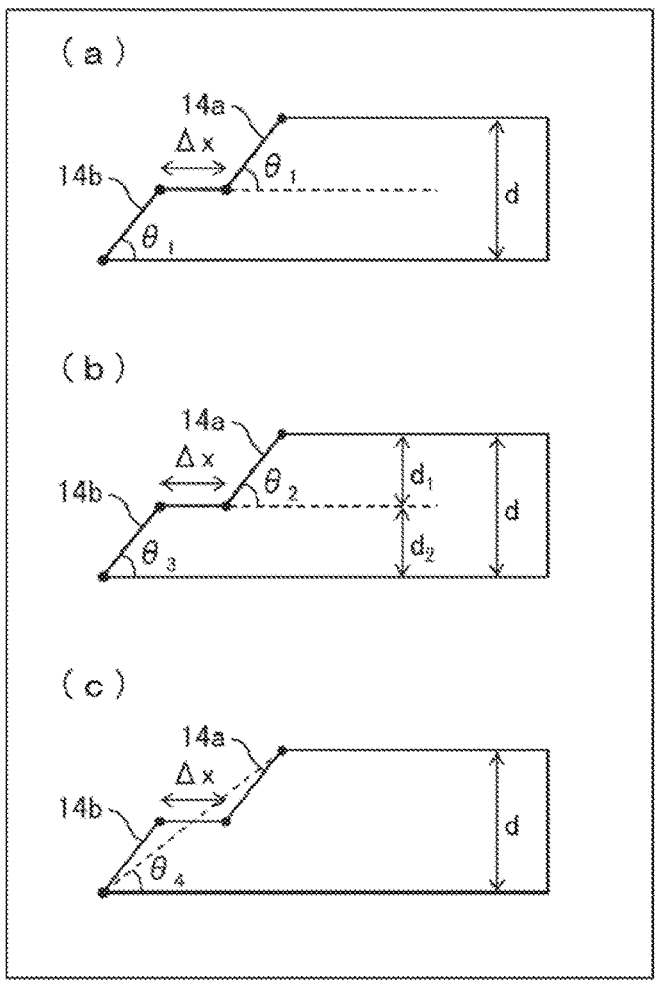

(a) of FIG. 14 to (c) of FIG. 14 illustrate structural examples of an upper electrode in accordance with Embodiment 3 of the present invention.

Figure 15:
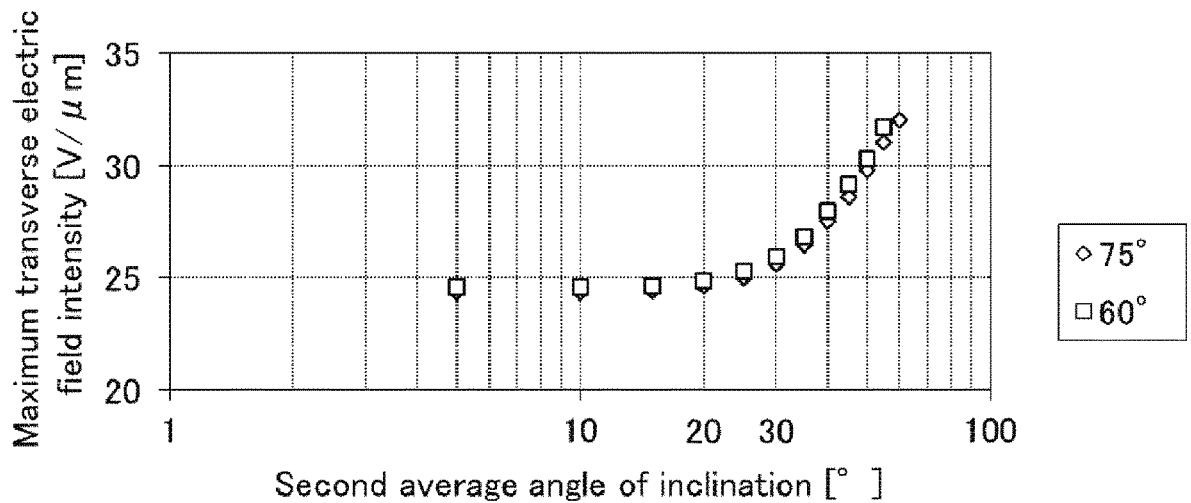

FIG. 15 is a drawing showing a result of simulation of the maximum transverse electric field intensity when a second average angle of inclination of an end surface of an upper electrode which end surface constitutes an opening is changed.

Figure 16:
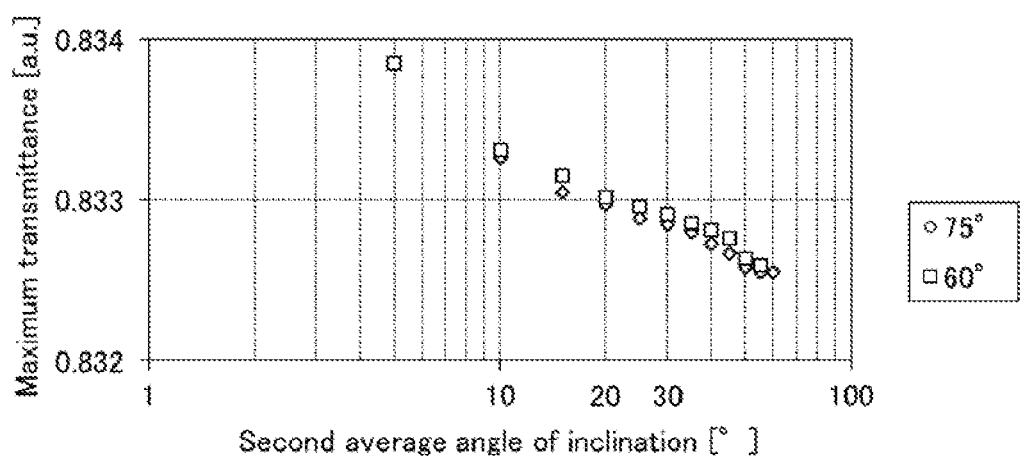

FIG. 16 is a drawing showing a result of simulation of the maximum transmittance when the second average angle of inclination of the end surface of the upper electrode which end surface constitutes an opening is changed.

Figure 17:
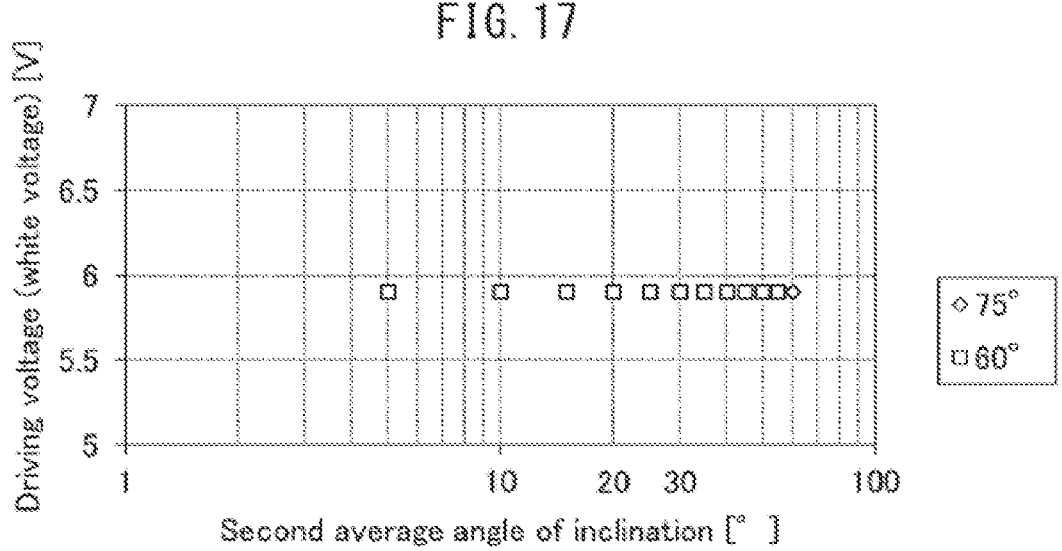

FIG. 17 is a drawing showing a result of simulation of a driving voltage at which the maximum transmittance is reached when the second average angle of inclination of the end surface of the upper electrode which end surface constitutes an opening is changed.

Figure 18:
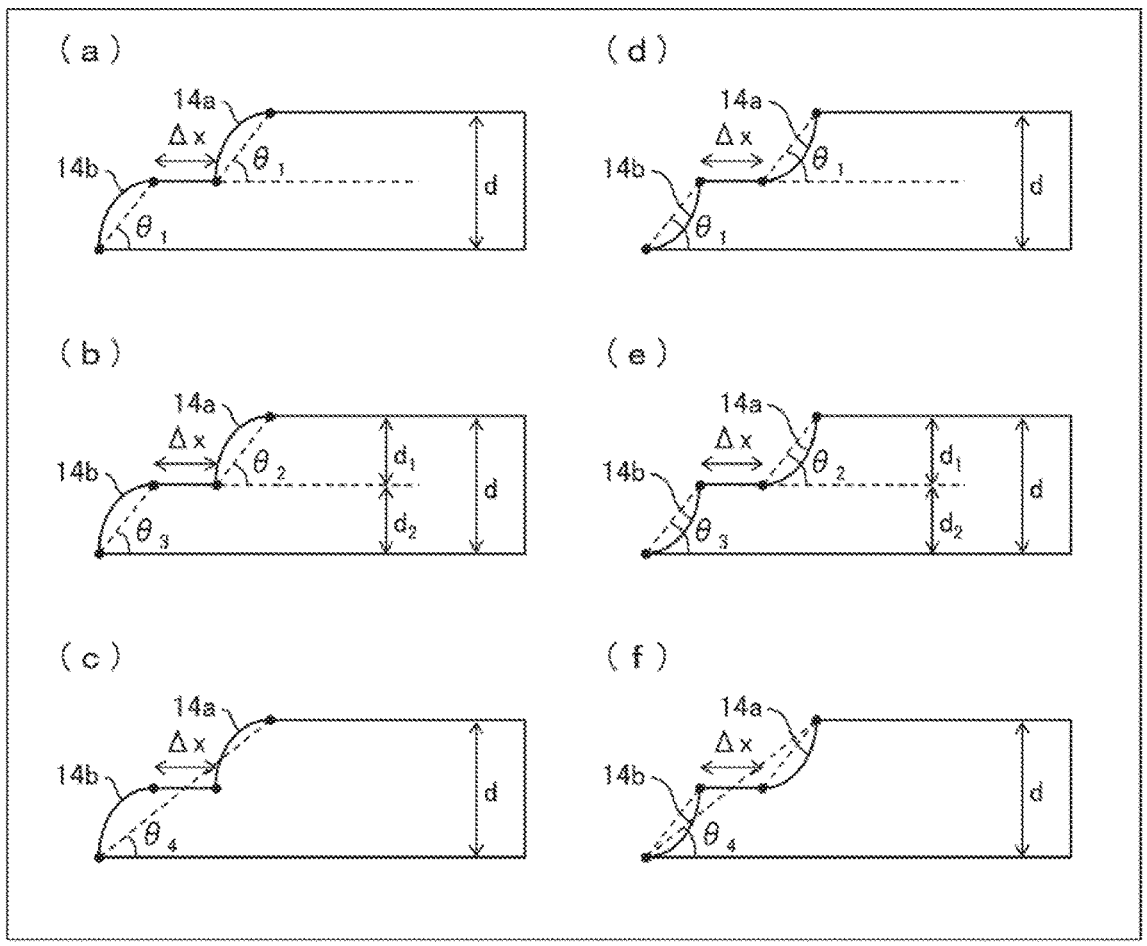

(a) of FIG. 18 to (f) of FIG. 18 illustrate structural examples of the upper electrode in accordance with Embodiment 3 of the present invention.

Figure 19:
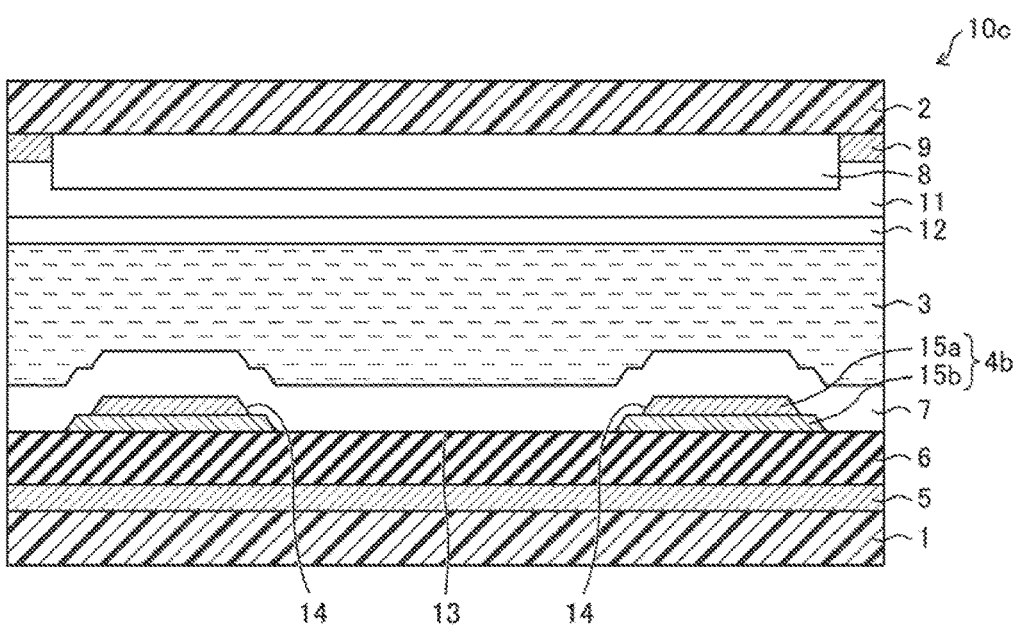

FIG. 19 is a drawing illustrating a configuration of a liquid crystal display device in accordance with Embodiment 4 of the present invention.

Figure 20:
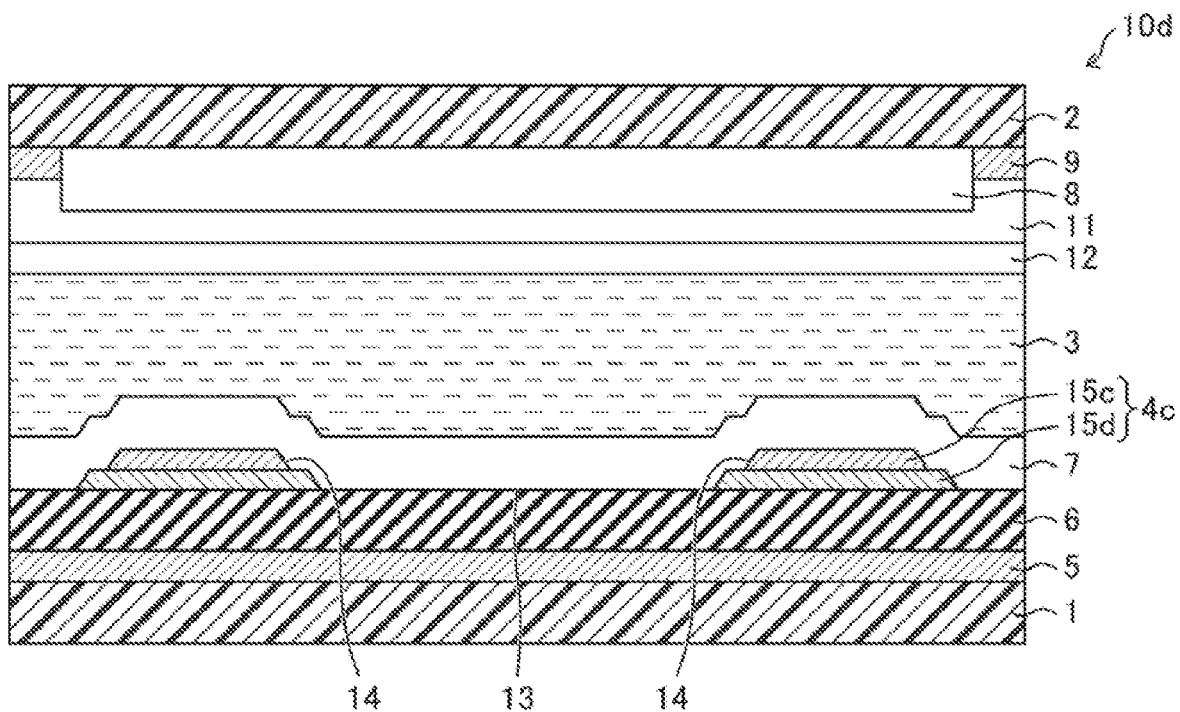

FIG. 20 is a drawing illustrating a configuration of a liquid crystal display device in accordance with Embodiment 5 of the present invention.

Figure 21:
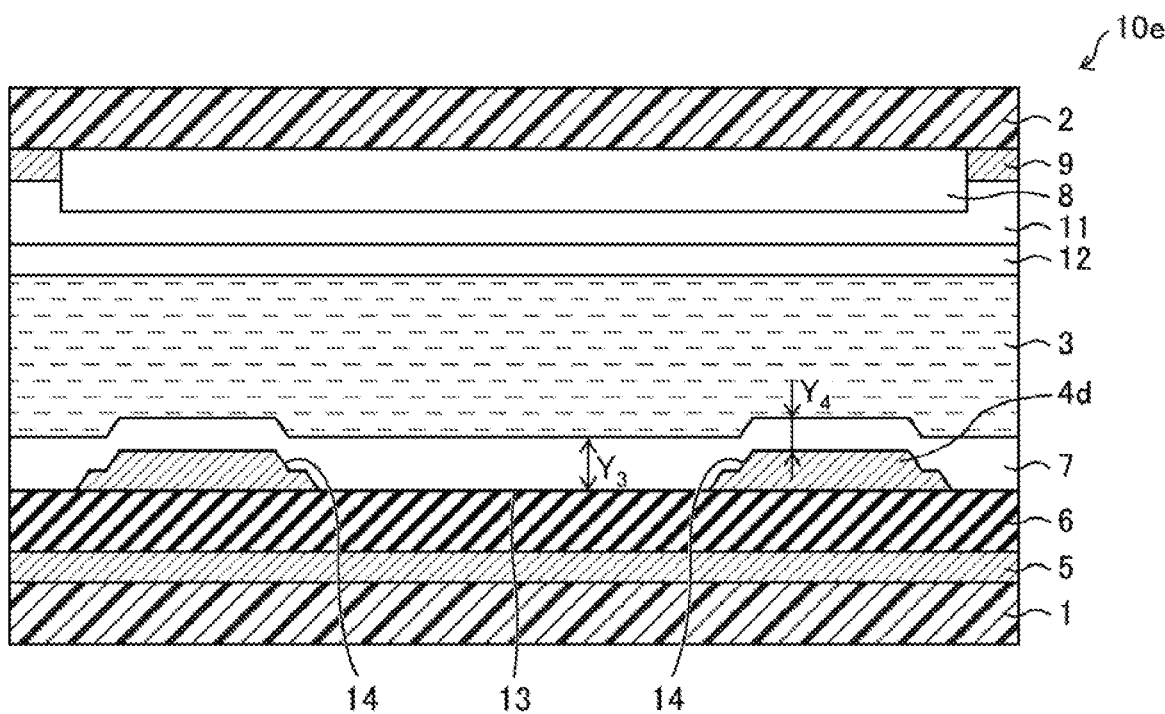

FIG. 21 is a drawing illustrating a configuration of a liquid crystal display device in accordance with Embodiment 6 of the present invention.

Figure 22:
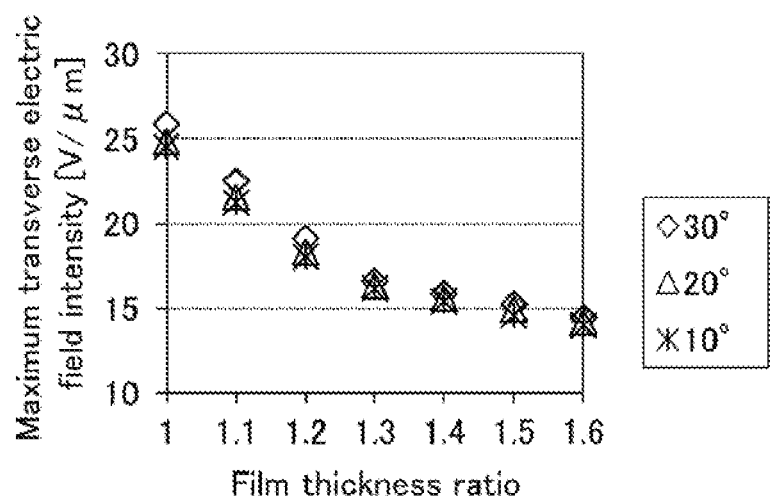

FIG. 22 is a graph showing a result of simulation of the maximum transverse electric field intensity in a case where a film thickness ratio between a film thickness of a second insulating layer at a lower end of an end surface of an upper electrode and a film thickness of the second insulating layer at a top surface of the upper electrode is changed.

Figure 23:
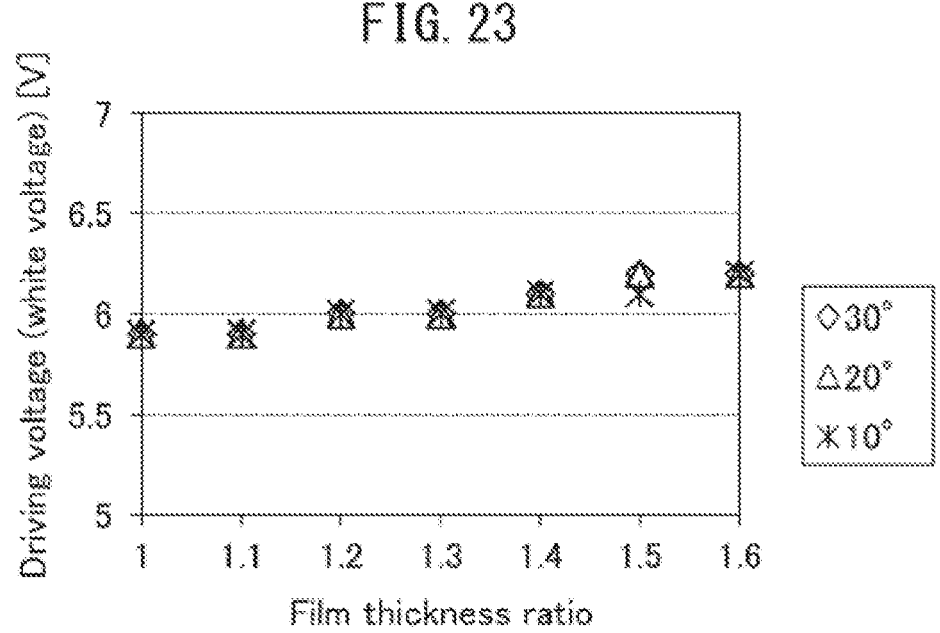

FIG. 23 is a graph showing a result of simulation of a driving voltage at which the maximum transmittance is reached in a case where the film thickness ratio between the film thickness of the second insulating layer at the lower end of the end surface of the upper electrode and the film thickness of the second insulating layer at the top surface of the upper electrode is changed.

DESCRIPTION OF EMBODIMENTS

Embodiment 1

The following description will discuss Embodiment 1 of the present invention.

(Configuration of Liquid Crystal Display Device)

Figure 1:
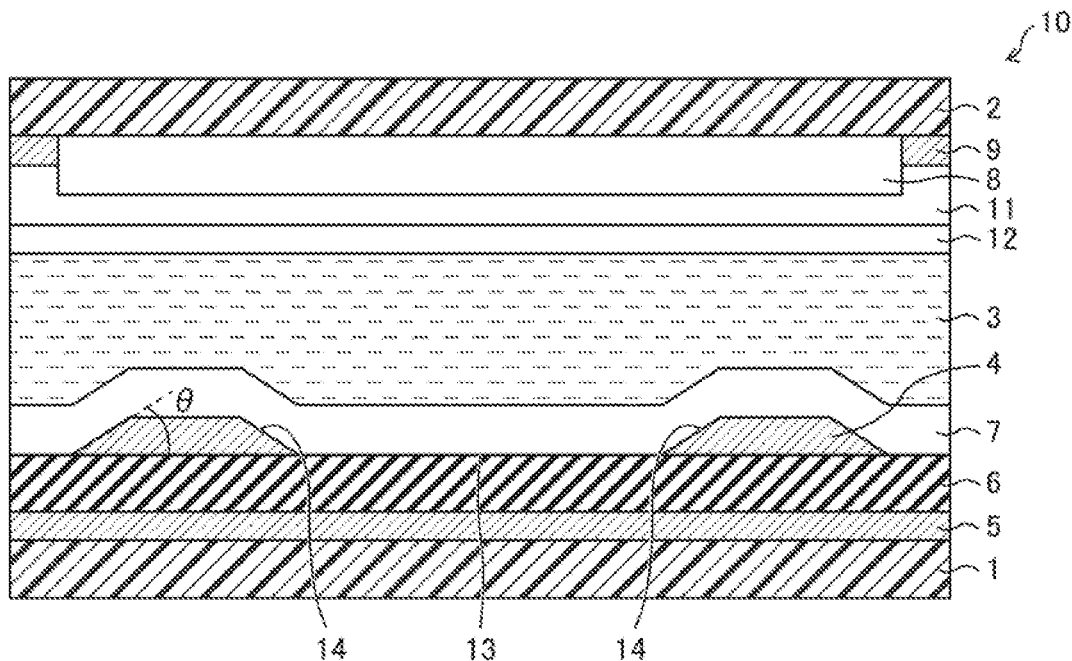
FIG. 1 is a drawing illustrating a configuration of a liquid crystal display device in accordance with Embodiment 1 of the present invention.

First, the following description will discuss, with reference to FIG. 1, a configuration of a liquid crystal display device 10 in accordance with Embodiment 1. FIG. 1 is a drawing illustrating the configuration of the liquid crystal display device 10 in accordance with Embodiment 1.

As illustrated in FIG. 1, the liquid crystal display device 10 includes a pair of substrates 1 and 2 which face each other, and a liquid crystal layer 3 provided between the pair of substrates 1 and 2.

On the substrate 1, an upper electrode 4, a lower electrode 5, and a first insulating layer 6 are provided in a stack so that the upper electrode 4 and the lower electrode 5 overlap each other via the first insulating layer 6. The upper electrode 4 is coated with a second insulating layer 7. On the substrate 2, a color filter 8, a light-shielding layer 9, an overcoat layer 11, and an alignment film 12 are provided in this order.

The liquid crystal layer 3 includes therein liquid crystal molecules. A direction in which the liquid crystal molecules are aligned is controlled by (i) an alignment treatment carried out by, for example, rubbing or photoalignment with respect to the second insulating layer 7 above the substrate 1 and to the alignment film above the substrate 2, and (ii) an electric field formed by application of a voltage across the upper electrode 4 and the lower electrode 5 which are above the substrate 1. Embodiment 1 uses a Fringe Field Switching (FFS) mode in which liquid crystal molecules are controlled with use of an electric field obliquely generated between the upper electrode 4 and the lower electrode 5 which are above the substrate 1 in response to the application of a voltage across the upper electrode 4 and the lower electrode 5 (such an electric field is a so-called fringe electric field).

The upper electrode 4 and the lower electrode 5 are each made of a transparent electroconductive material such as an ITO, an IZO, or a ZnO. The upper electrode 4 and the lower electrode 5 each have a thickness of, for example, 10 nm to 300 nm. Note that one and the other of the upper electrode 4 and the lower electrode 5 serve as a pixel electrode and a common electrode, respectively, depending on how to drive the liquid crystal display device 10. The upper electrode 4 is a slit-like electrode and has at least one opening 13.

The first insulating layer 6 is made of a light-transmitting material such as $SiO_2$, SiN, or SiON. The first insulating layer 6 has a thickness of, for example, 50 nm to 1500 nm. The second insulating layer 7 serves as an alignment film and can be, for example, a polyimide-based alignment film or an acrylic-based alignment film.

Commonly, thin film transistors for controlling display of pixels are provided between the lower electrode 5 and the substrate 1. Note, however, that no thin film transistors are illustrated in FIG. 1. In the liquid crystal display device 10, pixels are provided in an array. Note, however, that the description is herein given with a focus on a single pixel.

(FFS Mode)

Figure 2:
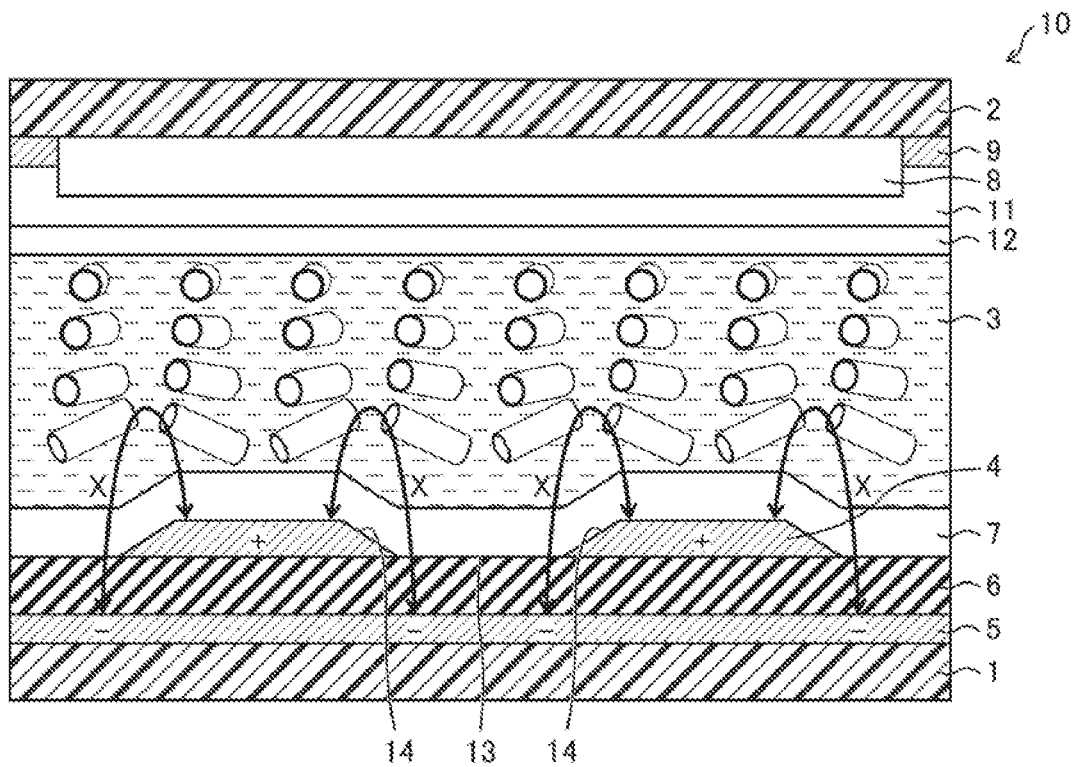
FIG. 2 is a drawing schematically illustrating a fringe electric field generated in an FFS mode.

The following will discuss the FFS mode with reference to FIG. 2. FIG. 2 is a drawing schematically illustrating a fringe electric field generated in the FFS mode.

As illustrated in FIG. 2, in a case where a voltage is applied across (i) the upper electrode 4 having the opening 13 and (ii) the lower electrode 5 overlapping the upper electrode 4 via the first insulating layer 6, a fringe electric field X is generated. The fringe electric field X contains the following two components: (a) a transverse electric field parallel to the substrates 1 and 2; and (b) a longitudinal electric field perpendicular to the substrates 1 and 2. The generation of the fringe electric field X causes the liquid crystal molecules to be aligned in response to the fringe electric field X. In a case where liquid crystals have positive dielectric constant anisotropy, liquid crystal molecules are aligned so that their major axes are parallel to the fringe electric field X. Meanwhile, in a case where liquid crystals have negative dielectric constant anisotropy, liquid crystal molecules are aligned so that their minor axes are parallel to the fringe electric field X. FIG. 2 illustrates a case where the liquid crystal molecules have positive dielectric constant anisotropy.

(Reduction in Electric Field Concentration)

The following description will discuss, with reference to FIG. 3, a structure of the upper electrode 4 of the liquid crystal display device 10 in accordance with Embodiment 1. (a) of FIG. 3 is a drawing schematically illustrating a fringe electric field generated in the liquid crystal display device 10 in accordance with Embodiment 1, and (b) of FIG. 3 is a drawing schematically illustrating a fringe electric field generated in a conventional liquid crystal display device.

As illustrated in (a) of FIG. 3, the upper electrode 4 has an end surface 14 constituting the opening 13 (hereinafter the end surface 14 may be merely referred to as an end surface). The end surface 14 is forward tapered. The end surface 14 forms, with the substrate 1, an average angle θ of inclination of not more than 30 degrees, preferably not more than 20 degrees, more preferably not more than 15 degrees, and further more preferably not more than 10 degrees. Note here that the average angle of inclination formed between the end surface 14 of the upper electrode 4 and the substrate 1 is an angle formed between (i) a line connecting an upper end and a lower end of the end surface 14 of the upper electrode 4 which end surface constitutes the opening 13 and (ii) the substrate 1.

According to the conventional FFS mode liquid crystal display device, as illustrated in (b) of FIG. 3, the end surface 14 of the upper electrode 4 is forward tapered and has an average angle θ' of inclination of 45 to 80 degrees. In a case where the end surface 14 of the upper electrode 4 has a great average angle θ' of inclination, a distance $W_1$ between the end surface 14 of the upper electrode 4 and the liquid crystal layer 3 is reduced. This causes generation of fringe electric fields $X_1$ and $X_2$ to be concentrated at an edge part of the upper electrode 4.

In contrast, according to the liquid crystal display device 10 in accordance with Embodiment 1, since the end surface 14 of the upper electrode 4 has a small average angle θ of inclination, a distance $W_2$ between the end surface 14 of the upper electrode 4 and the liquid crystal layer 3 is increased. A great distance $W_2$ prevents generation of fringe electric fields $X_3$ and $X_4$ from being concentrated at an edge part of the upper electrode 4. This makes it possible to reduce electric field concentration at the edge part of the upper electrode 4.

FIG. 4 shows a result of simulation of a maximum transverse electric field intensity in a case where the average angle of inclination of the end surface 14 of the upper electrode 4 which end surface constitutes the opening 13 is changed. In the present specification, electric field concentration in a liquid crystal display device is evaluated by calculating, through simulation, the maximum transverse electric field intensity in the liquid crystal display device.

FIG. 4 reveals the following. Specifically, in a case where the end surface 14 of the upper electrode 4 has an average angle of inclination of not more than 30 degrees, the maximum transverse electric field intensity decreases, so that electric field concentration is reduced at the edge part of the upper electrode 4. Since the electric field concentration is sufficiently reduced at the edge part of the upper electrode 4, it is possible to prevent the afterimage phenomenon from occurring in the liquid crystal display device 10.

(Increase in Transmittance)

Furthermore, the inventors of the present invention also repeatedly diligently studied a transmittance of a liquid crystal display device, and found that in a case where the end surface of the upper electrode has a smaller average angle of inclination, not only electric field concentration less occurs but also the liquid crystal display device has a higher transmittance. The reason for this will be discussed with reference to FIG. 5. (a) of FIG. 5 is a drawing schematically illustrating a transverse electric field generated in the liquid crystal display device 10 in accordance with Embodiment 1. (b) of FIG. 5 is a drawing schematically illustrating a transverse electric field generated in a conventional liquid crystal display device.

According to the conventional FFS mode liquid crystal display device, since the end surface 14 of the upper electrode 4 which end surface constitutes the opening 13 has a great average angle of inclination, the end surface 14 has a smaller area, and a smaller transverse electric field $Z_1$ is generated accordingly (see (b) of FIG. 5). Meanwhile, as described earlier, according to the conventional FFS mode liquid crystal display device, the fringe electric fields are extremely large at the edge part of the upper electrode 4.

Thus, liquid crystal molecules which are rotated by the fringe electric fields generated at the edge part draw liquid crystal molecules around those liquid crystal molecules to rotate. As a result, in a case where a transmittance is calculated by changing a pixel voltage, when a voltage at which a maximum transmittance is reached is applied, the liquid crystal molecules at or near the edge part of the upper electrode 4 excessively rotate, whereas the liquid crystal molecules at or near a center of the upper electrode 4 insufficiently rotate. As described above, due to excessive rotation of the liquid crystal molecules and insufficient rotation of the liquid crystal molecules, the conventional FFS mode liquid crystal display device has a lower transmittance.

In contrast, according to the liquid crystal display device 10 in accordance with Embodiment 1, since the end surface 14 of the upper electrode 4 which end surface constitutes the opening 13 has a small average angle of inclination, the end surface 14 has a larger area, and a larger transverse electric field $Z_2$ is generated accordingly (see (a) of FIG. 5). Meanwhile, as described earlier, according to the liquid crystal display device in accordance with Embodiment 1, the fringe electric fields are small at the edge part of the upper electrode 4.

Thus, liquid crystal molecules which are rotated by the fringe electric fields generated at the edge part are prevented from drawing liquid crystal molecules around those liquid crystal molecules. As a result, in a case where a voltage at which a maximum transmittance is reached is applied, the liquid crystal molecules at or near the edge part of the upper electrode 4 less excessively rotate, whereas the liquid crystal molecules at or near a center of the upper electrode 4 less insufficiently rotate. As described above, due to less excessive rotation of the liquid crystal molecules and less insufficient rotation of the liquid crystal molecules, the liquid crystal display device 10 in accordance with Embodiment 1 has a higher transmittance.

FIG. 6 shows a result of simulation of a maximum transmittance in a case where the average angle of inclination of the end surface 14 of the upper electrode 4 which end surface constitutes the opening 13 is changed. FIG. 7 shows a result of simulation of a driving voltage at which a maximum transmittance is reached (i.e., white voltage) in the case where the average angle of inclination of the end surface 14 of the upper electrode 4 which end surface constitutes the opening 13 is changed.

FIG. 6 reveals the following. Specifically, in a case where the end surface 14 of the upper electrode 4 has an average angle of inclination of not more than 30 degrees, the maximum transmittance increases. Meanwhile, FIG. 7 reveals the following. Specifically, in a case where the end surface 14 of the upper electrode 4 has an average angle of inclination of not more than 30 degrees, the driving voltage at which the maximum transmittance is reached does not change while the maximum transmittance increases. That is, in a case where the end surface 14 of the upper electrode 4 has an average angle of inclination of not more than 30 degrees, it is possible to increase the maximum transmittance without increasing the driving voltage.

(Reduction in Afterimage Phenomenon)

As described above, the liquid crystal display device 10 makes it possible to reduce electric field concentration at the edge part of the upper electrode 4 by causing the end surface 14 of the upper electrode 4 which end surface constitutes the opening 13 to have an average angle of inclination of not more than 30 degrees. In this case, the liquid crystal display device 10 does not have a lower transmittance. This makes it unnecessary to increase the driving voltage in the liquid crystal display device 10. Thus, the liquid crystal display device 10 in accordance with Embodiment 1 makes it possible to reduce the afterimage phenomenon while preventing an increase in driving voltage.

According to the liquid crystal display device 10, in a case where the end surface 14 of the upper electrode 4 which end surface constitutes the opening 13 has an average angle of inclination of not more than 30 degrees, a larger transverse electric field is generated in the end surface 14 of the upper electrode 4, so that the liquid crystal display device 10 has a higher transmittance. The liquid crystal display device 10 in accordance with Embodiment 1 thus makes it possible to achieve an increase in transmittance of the liquid crystal display device 10 while reducing the afterimage phenomenon while preventing an increase in driving voltage.

For example, FIG. 8 shows (i) a change in transverse electric field intensity in accordance with a position in the upper electrode in a case where the end surface of the upper electrode has an average angle of inclination of 10 degrees, and (ii) a change in transverse electric field intensity in accordance with a position in the upper electrode in a case where the end surface of the upper electrode has an average angle of inclination of 75 degrees. Note that a position in the upper electrode illustrated under a horizontal axis of FIG. 8 corresponds to a position in the horizontal axis. Thus, x Position=0 (or 8) corresponds to a central part of the upper electrode. The upper electrode represented by solid lines is an upper electrode having an end surface having an average angle of inclination of 10 degrees, and the upper electrode represented by broken lines is an upper electrode having an end surface having an average angle of inclination of 75 degrees.

FIG. 8 reveals the following. Specifically, the upper electrode having an end surface having an average angle of inclination of 10 degrees has, at a position corresponding to the edge part of the upper electrode, a lower transverse electric field intensity than the upper electrode having an end surface having an average angle of inclination of 75 degrees, so that electric field concentration is reduced. FIG. 8 also reveals the following. Specifically, the upper electrode having an end surface having an average angle of inclination of 10 degrees has, at a position corresponding to the end surface of the upper electrode, a higher transverse electric field intensity than the upper electrode having an end surface having an average angle of inclination of 75 degrees.

As described above, since the upper electrode having an end surface having an average angle of inclination of 10 degrees makes it possible to reduce electric field concentration at the edge part of the upper electrode while preventing an increase in driving voltage in the liquid crystal display device, it is possible to reduce the afterimage phenomenon while preventing an increase in driving voltage. According to the upper electrode having an end surface having an average angle of inclination of 10 degrees, a larger transverse electric field is generated in the end surface of the upper electrode, so that the liquid crystal display device has a higher transmittance. This makes it possible to achieve an increase in transmittance of the liquid crystal display device while reducing the afterimage phenomenon while preventing an increase in driving voltage.

(Structural Examples of Upper Electrode)

(a) of FIG. 9 to (c) of FIG. 9 show structural examples of the end surface 14 of the upper electrode 4. The end surface 14 of the upper electrode 4 can be a flat surface (see (a) of FIG. 9), a protruding curved surface (see (b) of FIG. 9), or a recessed curved surface (see (c) of FIG. 9).

As described above, the end surface 14 of the upper electrode 4 can have any shape provided that the end surface 14 has an average angle of inclination of not more than 30 degrees, the average angle of inclination being an angle formed between (i) a line connecting the upper end and the lower end of the end surface 14 and (ii) the substrate 1. Note that the end surface 14 of the upper electrode 4 preferably has the shape (c) from the viewpoint of a reduction in electric field concentration, and preferably has the shape (a) from the viewpoint of easiness of coating the upper electrode 4 with the second insulating layer 7.

Embodiment 2

The following description will discuss Embodiment 2 of the present invention with reference to FIG. 10. (a) and (b) of FIG. 10 are each a partially sectional view of a liquid crystal display device 10a in accordance with Embodiment 2. The following description will discuss only points of difference from Embodiment 1 and will not discuss other points.

As illustrated in (a) and (b) of FIG. 10, according to the liquid crystal display device 10a, a second insulating layer 7 has, at a lower end of an end surface 14 of an upper electrode 4, a film thickness $Y_1$ that is larger than a film thickness $Y_2$ which the second insulating layer 7 has at a top surface of the upper electrode 4. In this case, a film thickness ratio between the film thickness $Y_1$ at the lower end of the end surface 14 of the upper electrode 4 and the film thickness $Y_2$ at the top surface of the upper electrode 4 is preferably not less than 1.1, more preferably not less than 1.2, and still more preferably not less than 1.3. Note that an interface between a liquid crystal layer 3 and the second insulating layer 7 can be stepped as illustrated in (a) of FIG. 10 or flat as illustrated in (b) of FIG. 10.

In a case where the second insulating layer 7 has, at the lower end of the end surface 14 of the upper electrode 4, the film thickness $Y_1$ which is larger than the film thickness $Y_2$ which the second insulating layer 7 has at the top surface of the upper electrode 4, it is possible to achieve a longer effective distance between an edge part and its vicinity of the upper electrode 4 and the liquid crystal layer 3. This makes it possible to reduce electric field concentration at the edge part of the upper electrode 4.

FIG. 11 shows a result of simulation of a maximum transverse electric field intensity in a case where the film thickness ratio between the film thickness of the second insulating layer 7 at the lower end of the end surface 14 of the upper electrode 4 and the film thickness of the second insulating layer 7 at the top surface of the upper electrode 4 is changed. FIG. 12 shows a result of simulation of a driving voltage at which the maximum transmittance is reached (i.e. white voltage) in a case where the film thickness ratio is changed. Note that FIGS. 11 and 12 show the respective results of simulation which results are obtained in cases where the upper electrode 4 has average angles of inclination of 10 degrees and 20 degrees.

FIG. 11 reveals the following. Specifically, in a case where the film thickness ratio is not less than 1.1, the maximum transverse electric field intensity decreases. This makes it possible to further reduce the electric field concentration at the edge part of the upper electrode 4. Since the electric field concentration at the edge part of the upper electrode 4 is further reduced, it is possible to further prevent the afterimage phenomenon from occurring in the liquid crystal display device 10.

As is clear from FIG. 12, in a case where the film thickness ratio is not less than 1.1, the driving voltage increases merely slightly but not greatly. Thus, since the liquid crystal display device 10a in accordance with Embodiment 2 also makes it possible to reduce electric field concentration at the edge part of the upper electrode 4 while preventing an increase in driving voltage in the liquid crystal display device 10a, it is possible to reduce the afterimage phenomenon while preventing an increase in driving voltage.

In a case where the interface between the liquid crystal layer 3 and the second insulating layer 7 is stepped as illustrated in (a) of FIG. 10, the second insulating layer 7 is preferably, for example, a polyimide-based or acrylic-based alignment film. In a case where the second insulating layer 7 is such an alignment film, the interface between the liquid crystal layer 3 and the second insulating layer 7 can be made stepped by adjusting a viscosity of the alignment film and a method of applying the alignment film. The alignment film can be applied by, for example, spin coating or an ink-jet method.

The second insulating layer 7 can have a structure including a stack of two or more layers. In a case where the second insulating layer 7 has such a structure, at least a layer closest to the liquid crystal layer 3 preferably serves as the alignment film. Examples of a layer between (i) the upper electrode 4 and (ii) the layer closest to the liquid crystal layer 3 include inorganic films made of SiN, $SiO_2$, and SiON; and organic films made of polyimide-based, acrylic-based, and polysiloxane-based resin materials.

In a case where the interface between the liquid crystal layer 3 and the second insulating layer 7 is flat as illustrated in (b) of FIG. 10, the second insulating layer 7 is preferably, for example, an acrylic-based or polysiloxane-based planarizing film. In a case where the second insulating layer 7 is such an alignment film, the second insulating layer 7 can have, at the lower end of the end surface of the upper electrode 4, the film thickness which is larger than the film thickness which the second insulating layer 7 has at the top surface of the upper electrode 4.

Embodiment 3

The following description will discuss Embodiment 3 of the present invention with reference to FIG. 13. (a) of FIG. 13 is a drawing illustrating a configuration of a liquid crystal display device 10b in accordance with Embodiment 3. The following description will discuss only points of difference from Embodiments 1 and 2 and will not discuss other points.

As illustrated in FIG. 13, the liquid crystal display device 10b is configured such that an upper electrode 4a has an end surface 14 which constitutes an opening 13 and which has two or more steps so as to be stepped, the two or more steps protruding toward the opening 13 so that a portion on the end surface 14 is closer to the opening 13 as the portion is closer to a lower end of the end surface 14. That is, the upper electrode 4a has the end surface 14 which has an offset structure. In FIG. 13, the upper electrode 4a has the end surface 14 which has two steps so as to be stepped.

The following description will specifically discuss, with reference to FIG. 14, how the end surface 14 of the upper electrode 4a is shaped. (a) through (c) of FIG. 14 are each an enlarged view of the end surface 14 of the upper electrode 4a.

The upper electrode 4a has steps which have respective end surfaces 14a and 14b. The end surfaces 14a and 14b are each forward tapered and each form, with a substrate 1, a first average angle of inclination of less than 90 degrees. As illustrated in (a) of FIG. 14, the end surfaces 14a and 14b of the respective steps can have respective first average angles $\theta_1$ of inclination that are identical to each other. Alternatively, as illustrated in (b) of FIG. 14, the end surfaces 14a and 14b of the respective steps can have respective first average angles $\theta_2$ and $\theta_3$ of inclination that are different from each other. The first average angle of inclination of the end surface 14a of a corresponding step refers to an angle formed between (i) a line connecting an upper end and a lower end of the end surface 14a of the corresponding step and (ii) the substrate 1. The first average angle of inclination of the end surface 14b of a corresponding step refers to an angle formed between (a) a line connecting an upper end and a lower end of the end surface 14b of the corresponding step and (b) the substrate 1.

Note here that as illustrated in (c) of FIG. 14, the end surface 14 of the upper electrode 4a which constitutes an opening 13 (hereinafter may be hereinafter merely referred to as the end surface) forms, with the substrate 1, a second average angle $\theta_4$ of inclination of preferably not more than 30 degrees, more preferably not more than 20 degrees, and still more preferably not more than 10 degrees. Note that the average angle of inclination formed between the end surface 14 of the upper electrode 4a and the substrate 1 is an angle formed between (i) a line connecting the upper end and the lower end of the end surface 14 of the upper electrode 4a which end surface constitutes the opening 13 and (ii) the substrate 1. More specifically, the average angle of inclination formed between the end surface 14 of the upper electrode 4a and the substrate 1 is an angle formed between (i) a line connecting a lower end of the end surface 14b of the lowermost step of the upper electrode 4a and an upper end of the end surface 14a of the uppermost step of the upper electrode 4a and (ii) the substrate 1.

In a case where the end surfaces 14a and 14b of the respective steps of the upper layer electrode 4a have the respective first average angles of inclination that are identical to each other, the second average angle $\theta_4$ of inclination can be expressed by the following equation.

$$\theta_4 = \arctan\left(\frac{d}{\frac{d}{\tan\theta_1} + \Delta x}\right) \quad \text{[Math. 1]}$$

where $\theta_1$ is each of the respective first average angles of inclination of the end surfaces 14a and 14b of the respective steps, $\Delta x$ is a length of an offset between the steps, and d is a film thickness of the upper electrode 4a.

Meanwhile, in a case where the end surfaces 14a and 14b of the respective steps of the upper layer electrode 4a have the respective first average angles of inclination that are different from each other, the second average angle $\theta_4$ of inclination can be expressed by the following equation.

$$\theta_4 = \arctan\left(\frac{d}{\frac{d_1}{\tan\theta_2} + \frac{d_2}{\tan\theta_3} + \Delta x}\right) \quad \text{[Math. 2]}$$

where $\theta_2$ is the first average angle of inclination of the end surface 14a of the upper step, $\theta_3$ is the first average angle of inclination of the end surface 14b of the lower step, Δx is a length of an offset between the steps, $d_1$ is a film thickness of the upper step of the upper electrode 4a, and $d_2$ is a film thickness of the lower step of the upper electrode 4a.

The first average angles $θ_1$, $θ_2$, and $θ_3$ of inclination which satisfy $θ_4 ≤ 30$ only need to be selected in accordance with the above equations.

(Reduction in Electric Field Concentration)

FIG. 15 shows a result of simulation of a maximum transverse electric field intensity in a case where the second average angle of inclination of the end surface 14 of the upper electrode 4a which end surface constitutes the opening 13 is changed. In FIG. 15, electric field concentration in the liquid crystal display device is evaluated by calculating the maximum transverse electric field intensity in the liquid crystal display device. Note that FIG. 15 shows the result of simulation in cases where the end surfaces 14a and 14b of the respective steps of the upper layer electrode 4a each have first average angles of inclination of 75 degrees and 60 degrees.

FIG. 15 reveals the following. Specifically, in a case where the end surface 14 of the upper electrode 4a is stepped, the maximum transverse electric field intensity decreases, and also in cases where the end surfaces 14a and 14b of the respective steps of the upper layer electrode 4a each have first average angles of inclination which are large angles such as 75 degrees and 60 degrees, electric field concentration is reduced at an edge part of the upper electrode 4. In a case where the end surface 14 of the upper electrode 4a is stepped, the electric field concentration is sufficiently reduced at the edge part of the upper electrode 4a. This makes it possible to prevent the afterimage phenomenon from occurring in the liquid crystal display device 10b. FIG. 15 also reveals the following. Specifically, in a case where the end surface 14 of the upper electrode 4a has a second average angle of inclination of not more than 30 degrees, the maximum transverse electric field intensity is more dramatically reduced, so that the electric field concentration is more dramatically reduced at the edge part of the upper electrode 4a.

(Increase in Transmittance)

FIG. 16 shows a result of simulation of a maximum transmittance in a case where the second average angle of inclination of the end surface 14 of the upper electrode 4a which end surface constitutes the opening 13 is changed. FIG. 17 shows a result of simulation of a driving voltage at which a maximum transmittance is reached (i.e., white voltage) in the case where the second average angle of inclination of the end surface 14 of the upper electrode 4a which end surface constitutes the opening 13 is changed. Note that FIGS. 16 and 17 each show the result of simulation in cases where the end surfaces 14a and 14b of the respective steps of the upper electrode 4a each have first average angles of inclination of 75 degrees and 60 degrees.

FIG. 16 reveals the following. Specifically, in a case where the end surface 14 of the upper electrode 4a is stepped, the maximum transmittance increases. Meanwhile, FIG. 17 reveals the following. Specifically, in a case where the end surface 14 of the upper electrode 4a is stepped, the maximum transmittance increases whereas a driving voltage at which the maximum transmittance is reached is not changed. That is, in a case where the end surface 14 of the upper electrode 4a is stepped, it is possible to increase the maximum transmittance without increasing the driving voltage. FIG. 16 reveals that in a case where the second average angle of inclination of the end surface 14 of the upper electrode 4a is not more than 30 degrees, the maximum transmittance is increased more dramatically.

(Reduction in Afterimage Phenomenon)

As described above, the liquid crystal display device 10b makes it possible to reduce electric field concentration at the edge part of the upper electrode 4a by causing the end surface 14 of the upper electrode 4a to be stepped. In this case, the liquid crystal display device 10b does not have a lower transmittance. This makes it unnecessary to increase the driving voltage in the liquid crystal display device 10b. Thus, the liquid crystal display device 10b in accordance with Embodiment 3 makes it possible to reduce the afterimage phenomenon while preventing an increase in driving voltage.

According to the liquid crystal display device 10b in accordance with Embodiment 3, since the end surface 14 of the upper electrode 4a is stepped, a larger transverse electric field is generated in the end surface of the upper electrode 4a, so that the liquid crystal display device 10b has a higher transmittance. The liquid crystal display device 10b in accordance with Embodiment 3 thus makes it possible to achieve an increase in transmittance of the liquid crystal display device 10b while reducing the afterimage phenomenon while preventing an increase in driving voltage.

(Structural Examples of Upper Electrode)

(a) of FIG. 18 to (f) of FIG. 18 show structural examples of the end surface 14 of the upper electrode 4a. The upper electrode 4a can have the steps which have the respective end surfaces 14a and 14b each of which is a flat surface (see (a) of FIG. 14), a protruding curved surface (see (a) and (b) of FIG. 18), or a recessed curved surface (see (d) and (e) of FIG. 18).

Also in a case where the upper electrode 4a have the steps which have the respective end surfaces 14a and 14b each of which is a protruding curved surface, the first average angles of inclination of the end surfaces 14a and 14b of the respective steps can have respective angles $θ_1$ that are identical to each other (see (a) of FIG. 18), or can have different angles $θ_2$ and $θ_3$, respectively (see (b) of FIG. 18).

Also in this case, the second average angle $θ_4$ of inclination formed between the end surface 14 of the upper electrode 4a and the substrate 1 is preferably not more than 30 degrees, more preferably not more than 20 degrees, and still more preferably not more than 10 degrees (see (c) of FIG. 18).

Also in a case where the upper electrode 4a have the steps which have the respective end surfaces 14a and 14b each of which is a recessed curved surface, the first average angles of inclination of the end surfaces 14a and 14b of the respective steps can have angles $θ_1$ that are identical to each other (see (d) of FIG. 18), or can have different angles $θ_2$ and $θ_3$, respectively (see (e) of FIG. 18).

Also in this case, the second average angle $θ_4$ of inclination formed between the end surface 14 of the upper electrode 4a and the substrate 1 is preferably not more than 30 degrees, more preferably not more than 20 degrees, and still more preferably not more than 10 degrees (see (f) of FIG. 18).

As described above, the end surfaces 14a and 14b of the respective steps of the upper layer electrode 4a can have any shape.

Note that the steps of the upper layer electrode 4a are made of respective materials that are identical to each other. The upper electrode 4a can be made stepped by, for example, patterning carried out by use of a halftone mask, or etching.

Embodiment 4

The following description will discuss Embodiment 4 of the present invention, with reference to FIG. 19. FIG. 19 is a drawing illustrating a configuration of a liquid crystal display device 10c in accordance with Embodiment 4. The following description will discuss only points of difference from Embodiments 1 through 3 and will not discuss other points.

As illustrated in FIG. 19, the liquid crystal display device 10c is configured such that an upper electrode 4b has an end surface 14 which constitutes the opening 13 and which has two or more steps so as to be stepped, the two or more steps protruding toward the opening 13 so that a portion on the end surface 14 is closer to the opening 13 as the portion is closer to a lower end of the end surface 14. That is, the upper electrode 4b has the end surface 14 which has an offset structure. In FIG. 19, the upper electrode 4b has the end surface 14 which has two steps so as to be stepped. Note that the respective end surfaces 14 of the upper electrode 4b and the upper electrode 4a in accordance with Embodiment 3 are identical in specific shape.

Furthermore, the upper electrode 4b has a multilayer structure in which the upper electrode 4b is divided into layers by steps. In FIG. 19, the upper electrode 4b has a multilayer structure including an upper layer 15a and a lower layer 15b. The steps of the upper electrode 4b are made of respective materials which are different in composition.

For example, the upper layer 15a is preferably made of a material that has a higher etching rate than a material of which the lower layer 15b is made. This allows the upper electrode 4b to be easily stepped, i.e., easily have an offset structure. The materials of which the upper layer 15a and the lower layer 15b, respectively, are made can be used in combination as below. Specifically, for example, the upper layer 15a and the lower layer 15b can be made of an amorphous IZO and a polycrystalline ITO, respectively.

Note that an offset of the upper electrode 4b can be formed in a large size by, for example, (i) etching the upper layer 15a and the lower layer 15b by use of an etchant that allows the upper layer 15a and the lower layer 15b to be etched, e.g., an etchant such as a $FeCl_3$+HCl-based mixed solution, and then, for example, (ii) etching the upper layer 15a by use of an etchant that allows only the upper layer 15a to be etched, e.g. an etchant such as an aqueous oxalic acid-based solution.

Embodiment 5

The following description will discuss Embodiment 5 of the present invention, with reference to FIG. 20. FIG. 20 is a drawing illustrating a configuration of a liquid crystal display device 10d in accordance with Embodiment 5. The following description will discuss only points of difference from Embodiments 1 through 4, and will not discuss other points.

As illustrated in FIG. 20, the liquid crystal display device 10d is configured such that an upper electrode 4c has an end surface 14 which constitutes the opening 13 and which has two or more steps so as to be stepped, the two or more steps protruding toward the opening 13 so that a portion on the end surface 14 is closer to the opening 13 as the portion is closer to a lower end of the end surface 14. That is, the upper electrode 4c has the end surface 14 which has an offset structure. In FIG. 20, the upper electrode 4c has the end surface 14 which has two steps so as to be stepped. Note that the respective end surfaces 14 of the upper electrode 4c and the upper electrode 4a in accordance with Embodiment 3 are identical in specific shape.

Furthermore, the upper electrode 4b has a multi-layer structure in which the upper electrode 4b is divided into layers by steps. In FIG. 20, the upper electrode 4c has a multi-layer structure including an upper layer 15c and a lower layer 15d. The steps of the upper electrode 4c are made of respective materials which are identical in composition.

For example, it is preferable that the upper 15c be made of an amorphous ITO and the lower layer 15d be made of a polycrystalline ITO. Alternatively, in a case where the upper layer 15c and the lower layer 15d are made of respective polycrystalline ITOs that are identical to each other, the upper layer 15c is preferably made of the polycrystalline ITO which has a smaller grain size than the polycrystalline ITO of which the lower layer 15d is made. With the arrangement, the material of which the upper layer 15c is made has a higher etching rate than the material of which the lower layer 15d is made. This allows the upper electrode 4c to be easily stepped, i.e., easily have an offset structure.

A method for causing the ITO of which the upper layer 15c is made to have a smaller grain size than the ITO of which the lower layer 15d is made is exemplified by the method below. Specifically, the lower layer 15d is formed by use of a polycrystalline ITO and then an ITO for forming the upper layer 15c is provided on the lower layer 15d at a substrate temperature lower than a substrate temperature at which the lower layer 15d was formed, so that the ITO of which the upper layer 15c has a smaller grain size than the ITO of which the lower layer 15d is made. Alternatively, the lower layer 15d is formed by use of a polycrystalline ITO and then annealed at a temperature higher than a substrate temperature at which the lower layer 15d was formed, and the upper layer 15c is formed by use of a polycrystalline ITO at a low temperature again, so that the ITO of which the lower layer 15d is made has a larger grain size than the ITO of which the upper layer 15c is made.

Note that an offset of the upper electrode 4c can be formed in a large size by, for example, (i) etching the upper layer 15c and the lower layer 15d by use of an etchant that allows the upper layer 15c and the lower layer 15d to be etched, e.g. an etchant such as a $FeCl_3$+HCl-based mixed solution, and then, for example, (ii) etching the upper layer 15c by use of an etchant that allows only the upper 15c to be etched, e.g. an etchant such as an aqueous oxalic acid-based solution.

Embodiment 6

The following description will discuss Embodiment 6 of the present invention, with reference to FIG. 21. FIG. 21 is a drawing illustrating a configuration of a liquid crystal display device 10e in accordance with Embodiment 6. The following description will discuss only points of difference from Embodiments 1 through 5 and will not discuss other points.

As illustrated in FIG. 21, the liquid crystal display device 10e is configured such that an upper electrode 4d has an end surface 14 which constitutes the opening 13 and which has two or more steps so as to be stepped, the two or more steps protruding toward the opening 13 so that a portion on the end surface 14 is closer to the opening 13 as the portion is closer to a lower end of the end surface 14. That is, the upper electrode 4d has the end surface 14 which has an offset structure. In FIG. 21, the upper electrode 4d has the end surface 14 which has two steps so as to be stepped. Note that the respective end surfaces 14 of the upper electrode 4d and the upper electrode 4a in accordance with Embodiment 3 are identical in specific shape.

Furthermore, according to the liquid crystal display device 10e, a second insulating layer 7 has, at a lower end of an end surface 14b at a lowermost step of the upper electrode 4d, a film thickness $Y_3$ that is larger than a film thickness $Y_4$ which the second insulating layer 7 has at a top surface of the upper electrode 4d (see FIG. 21). In this case, a film thickness ratio between the film thickness $Y_3$ at the lower end of the end surface 14b at the lowermost step of the upper electrode 4d and the film thickness $Y_4$ at the top surface of the upper electrode 4d is preferably not less than 1.1, more preferably not less than 1.2, and still more preferably not less than 1.3. Note that an interface between a liquid crystal layer 3 and the second insulating layer 7 can be stepped (see FIG. 21) or flat. The second insulating layer 7 of Embodiment 6 and the second insulating layer 7 of Embodiment 2 are identical in, for example, specifically of what material the second insulating layer 7 is made and specifically how to form the second insulating layer 7.

In a case where the second insulating layer 7 has, at the lower end of the end surface 14b at the lowermost step of the upper electrode 4d, the film thickness $Y_3$ which is larger than the film thickness $Y_4$ which the second insulating layer 7 has at the top surface of the upper electrode 4d, it is possible to achieve a longer effective distance between an edge part and its vicinity of the upper electrode 4d and the liquid crystal layer 3. This makes it possible to reduce electric field concentration at the edge part of the upper electrode 4d.

Here, FIG. 22 shows the result of simulation of the maximum transverse electric field intensity in a case where the film thickness ratio between the film thickness of the second insulating layer 7 at the lower end of the end surface 14b at the lowermost step of the upper electrode 4d and the film thickness of the second insulating layer 7 at the top surface of the upper electrode 4d is changed. FIG. 23 shows a result of simulation of a driving voltage at which the maximum transmittance is reached (i.e. white voltage) in the case where the film thickness ratio is changed. Note that FIGS. 22 and 23 show the respective results of simulations which results were obtained in cases where the upper electrode 4d has the second average angles of inclination of 10 degrees, 20 degrees, and 30 degrees.

FIG. 22 reveals the following. Specifically, in a case where the film thickness ratio is not less than 1.1, the maximum transverse electric field intensity decreases. This makes it possible to further reduce the electric field concentration at the edge part of the upper electrode 4d. Since the electric field concentration at the edge part of the upper electrode 4d is further reduced, it is possible to further prevent the afterimage phenomenon from occurring in the liquid crystal display device 10e.

As is clear from FIG. 23, in a case where the film thickness ratio is not less than 1.1, the driving voltage increases merely slightly but greatly. Thus, since the liquid crystal display device 10e in accordance with Embodiment 6 also makes it possible to reduce electric field concentration at the edge part of the upper electrode 4d while preventing an increase in driving voltage in the liquid crystal display device 10e, it is possible to reduce the afterimage phenomenon while preventing an increase in driving voltage.

[Recap]

A liquid crystal display device 10 in accordance with aspect 1 of the present invention includes: a liquid crystal layer 3 and a pair of substrates 1 and 2 which face each other across the liquid crystal layer 3; and an upper electrode 4, a lower electrode 5, and a first insulating layer 6 which are provided in a stack on the substrate 1 of the pair of substrates 1 and 2 so that the upper electrode 4 and the lower electrode 5 overlap each other via the first insulating layer 6, the upper electrode 4 having an opening 13, the upper electrode 4 having an end surface 14 which constitutes the opening 13, the end surface 14 being forward tapered and forming, with the substrate 1, an average angle of inclination of not more than 30 degrees.

With the arrangement, the upper electrode 4 has the end surface 14 which constitutes the opening 13 and which has the average angle of inclination of not more than 30 degrees. This makes it possible to reduce electric field concentration at the edge part of the upper electrode 4. In this case, the liquid crystal display device 10 does not have a lower transmittance. This makes it unnecessary to increase a driving voltage in the liquid crystal display device 10. Thus, the liquid crystal display device 10 in accordance with one aspect of the present invention makes it possible to reduce the afterimage phenomenon while preventing an increase in driving voltage.

Furthermore, according to the liquid crystal display device 10 in accordance with one aspect of the present invention, the end surface 14 of the upper electrode 4 which end surface constitutes the opening 13 has the average angle of inclination of not more than 30 degrees. This increases a transverse electric field at the end surface 14 of the upper electrode 4, so that the liquid crystal display device 10 has a higher transmittance. The liquid crystal display device 10 in accordance with one aspect of the present invention thus makes it possible to achieve an increase in transmittance of the liquid crystal display device 10 while reducing the afterimage phenomenon while preventing an increase in driving voltage.

The liquid crystal display device 10 in accordance with aspect 2 of the present invention is an arrangement of the aspect 1, wherein the end surface 14 of the upper electrode 4 which end surface constitutes the opening 13 is forward tapered and forms, with the substrate 1, an average angle of inclination of not more than 20 degrees.

With the arrangement, it is possible to more dramatically reduce electric field concentration at the edge part of the upper electrode 4. Accordingly, the liquid crystal display device 10 in accordance with one aspect of the present invention makes it possible to more surely reduce the afterimage phenomenon.

Furthermore, in the liquid crystal display device 10 in accordance with one aspect of the present invention, the transverse electric field at the end surface 14 of the upper electrode 4 is increased more dramatically, so that the liquid crystal display device 10 has a more dramatically increased transmittance. The liquid crystal display device 10 in accordance with one aspect of the present invention thus makes it possible to further increase the transmittance of the liquid crystal display device 10 while further reducing the afterimage phenomenon while preventing an increase in driving voltage.

The liquid crystal display device 10a in accordance with aspect 3 of the present invention may be an arrangement of the aspect 1 or 2, further comprising a second insulating layer 7 provided between the upper electrode 4 and the liquid crystal layer 3, the second insulating layer 7 having a larger thickness at a lower end of the end surface 14 of the upper electrode 4 than at a top surface of the upper electrode 4.

With the arrangement, the second insulating layer 7 has a larger thickness at a lower end of the end surface 14 of the upper electrode 4 than at a top surface of the upper electrode 4. This ensures a larger effective distance between an edge part and its vicinity of the upper electrode 4 and the liquid crystal layer 3, so that electric field concentration at the edge part of the upper electrode 4 can be reduced.

A liquid crystal display device 10b-10e in accordance with aspect 4 of the present invention includes: a liquid crystal layer 3 and a pair of substrates 1 and 2 which face each other across the liquid crystal layer 3; and an upper electrode 4a-4d, a lower electrode 5, and a first insulating layer 6 which are provided in a stack on the substrate 1 of the pair of substrates 1 and 2 so that the upper electrode 4a-4d and the lower electrode 5 overlap each other via the first insulating layer 6, the upper electrode 4a-4d having an opening 13, the upper electrode 4a-4d having an end surface 14 which constitutes the opening 13, the end surface 14 having two or more steps so as to be stepped, the two or more steps protruding toward the opening 13 so that a portion on the end surface 14 is closer to the opening 13 as the portion is closer to a lower end of the end surface 14, the two or more steps of the upper electrode 4a having respective end surfaces 14a and 14b each of which forms, with the substrate 1, a first average angle of inclination of less than 90 degrees.

With the arrangement, the end surface 14 of the upper electrode 4a-4d which end surface constitutes the opening 13 is stepped. This makes it possible to reduce electric field concentration at the edge part of the upper electrode 4a. In this case, the liquid crystal display device 10b-10e does not have a lower transmittance. This makes it unnecessary to increase a driving voltage in the liquid crystal display device 10b-10e. The liquid crystal display device 10b-10e in accordance with one aspect of the present invention thus makes it possible to reduce the afterimage phenomenon while preventing an increase in driving voltage.

Furthermore, in the liquid crystal display device 10b-10e in accordance with one aspect of the present invention, the end surface 14 of the upper electrode 4a-4d which end surface constitutes the opening 13 is stepped. This increases a transverse electric field at the end surface 14 of the upper electrode 4a-4d, so that the liquid crystal display device 10b-10e has a higher transmittance. The liquid crystal display device 10b-10e in accordance with one aspect of the present invention thus makes it possible to increase the transmittance of the liquid crystal display device 10b-10e while reducing the afterimage phenomenon while preventing an increase in driving voltage.

The liquid crystal display device 10c in accordance with aspect 5 of the present invention may be an arrangement of the aspect 4, wherein the two or more steps of the upper electrode 4b are made of respective materials which are different in composition.

With the arrangement, respective materials which are different in composition are used for the two or more steps, so that respective etching rates for the two or more steps can be changed. This allows the upper electrode 4b to be easily stepped.

The liquid crystal display device 10d in accordance with aspect 6 of the present invention may be an arrangement of the aspect 4, wherein the two or more steps of the upper electrode 4c are made of respective materials which are identical in composition, and the respective materials of which the two or more steps of the upper electrode 4c are made are different in crystal grain size.

With the arrangement, respective materials which are different in crystal grain size are used for the two or more steps, so that respective etching rates for the two or more steps can be changed. This allows the upper electrode 4c to be easily stepped.

The liquid crystal display device 10e in accordance with aspect 7 of the present invention is an arrangement of any one of the aspects 4 through 6, wherein the end surface 14 of the upper electrode 4 which end surface constitutes the opening 13 forms, with the substrate 1, a second average angle $\theta_4$ of inclination of not more than 30 degrees.

With the arrangement, electric field concentration at the edge part of the upper electrode 4d can be reduced more dramatically. The liquid crystal display device 10e in accordance with one aspect of the present invention thus makes it possible to more surely reduce the afterimage phenomenon.

Furthermore, according to the liquid crystal display device 10e in accordance with one aspect of the present invention, a transverse electric field at the end surface 14 of the upper electrode 4d is increased more dramatically, so that the liquid crystal display device 10e has more dramatically increased transmittance. The liquid crystal display device 10e in accordance with one aspect of the present invention thus makes it possible to further increase the transmittance of the liquid crystal display device 10e while further reducing the afterimage phenomenon while preventing an increase in driving voltage.

The liquid crystal display device 10e in accordance with aspect 8 of the present invention may be an arrangement of any one of the aspects 4 through 7, further comprising a second insulating layer 7 provided between the upper electrode 4d and the liquid crystal layer 3, the second insulating layer 7 having a larger thickness at a lower end of the end surface 14b of a lowermost step of the upper electrode 4d than at a top surface of the upper electrode 4d.

With the arrangement, the second insulating layer 7 has a larger thickness at a lower end of the end surface 14b of a lowermost step of the upper electrode 4d than at a top surface of the upper electrode 4d. This ensures a larger effective distance between an edge part and its vicinity of the upper electrode 4d and the liquid crystal layer 3, so that electric field concentration at the edge part of the upper electrode 4d can be reduced.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST

1, 2 Substrate
3 Liquid crystal layer
4, 4a-4d Upper electrode
5 Lower electrode
6 First insulating layer
7 Second insulating layer
8 Color filter
9 Light-shielding layer
10, 10a-10e Liquid crystal display device
11 Overcoat layer
12 Alignment film
13 Opening
14, 14a, 14b End surface

The invention claimed is:

1. A liquid crystal display device comprising:
   a liquid crystal layer and a pair of substrates which face each other across the liquid crystal layer; and
   an upper electrode, a lower electrode, and a first insulating layer which are provided in a stack on one of the pair of substrates so that the upper electrode and the lower electrode overlap each other via the first insulating layer,
   the upper electrode having an opening,
   the upper electrode having an end surface which constitutes the opening, the end surface having two or more steps so as to be stepped, the two or more steps protruding toward the opening so that a portion on the end surface is closer to the opening as the portion is closer to a lower end of the end surface,
   the two or more steps of the upper layer electrode having respective end surfaces each of which forms, with the one of the pair of substrates, a first average angle of inclination of less than 90 degrees,
   the two or more steps of the upper electrode are made of respective materials which are identical in composition; and
   the respective materials of which the two or more steps of the upper layer electrode are made are different in grain size.

2. The liquid crystal display device as set forth in claim 1, wherein the end surface of the upper electrode which end surface constitutes the opening forms, with the one of the pair of substrates, a second average angle of inclination of not more than 30 degrees.

3. The liquid crystal display device as set forth in claim 1, further comprising:
   a second insulating layer provided between the upper electrode and the liquid crystal layer,
   the second insulating layer having a larger thickness at a lower end of the end surface of a lowermost step of the upper electrode than at a top surface of the upper electrode.

4. A liquid crystal display device comprising:
   a liquid crystal layer and a pair of substrates which face each other across the liquid crystal layer;
   an upper electrode, a lower electrode, and a first insulating layer; and
   a second insulating layer;
   the first insulating layer which is provided in a stack on one of the pair of substrates so that the upper electrode and the lower electrode overlap each other via the first insulating layer,
   the upper electrode having an opening,
   the upper electrode having an end surface which constitutes the opening, the end surface having two or more steps so as to be stepped, the two or more steps protruding toward the opening so that a portion on the end surface is closer to the opening as the portion is closer to a lower end of the end surface,
   the two or more steps of the upper layer electrode having respective end surfaces each of which forms, with the one of the pair of substrates, a first average angle of inclination of less than 90 degrees,
   the second insulating layer provided between the upper electrode and the liquid crystal layer, and
   the second insulating layer having a larger thickness at a lower end of the end surface of a lowermost step of the upper electrode than at a top surface of the upper electrode, wherein the two or more steps of the upper electrode are made of respective materials which are different in composition.

5. The liquid crystal display device as set forth in claim 4, wherein the end surface of the upper electrode which end surface constitutes the opening forms, with the one of the pair of substrates, a second average angle of inclination of not more than 30 degrees.

* * * * *